Figure 1:
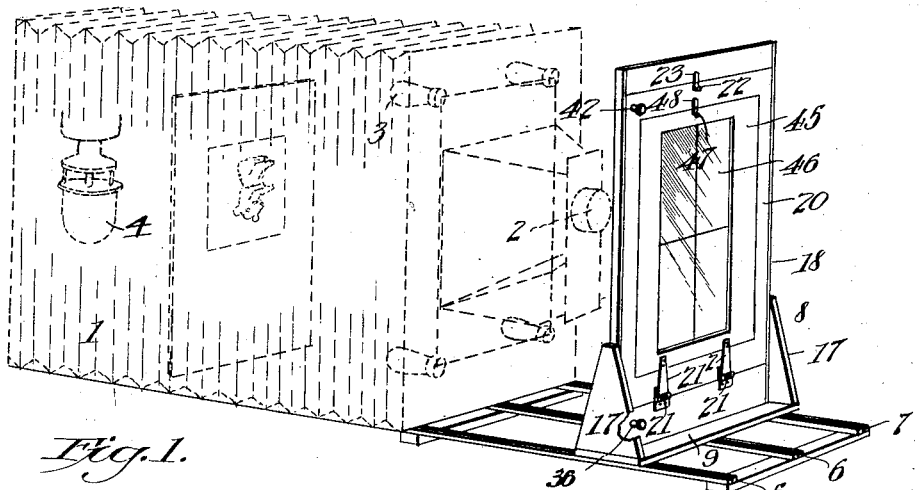

E. S. FRENCH & W. H. CARSON.
EASEL.
APPLICATION FILED NOV. 19, 1913.

1,141,704.

Patented June 1, 1915.
2 SHEETS—SHEET 1.

WITNESSES:

INVENTORS
Elsamur S. French &
Walter H. Carson,
BY
ATTORNEY

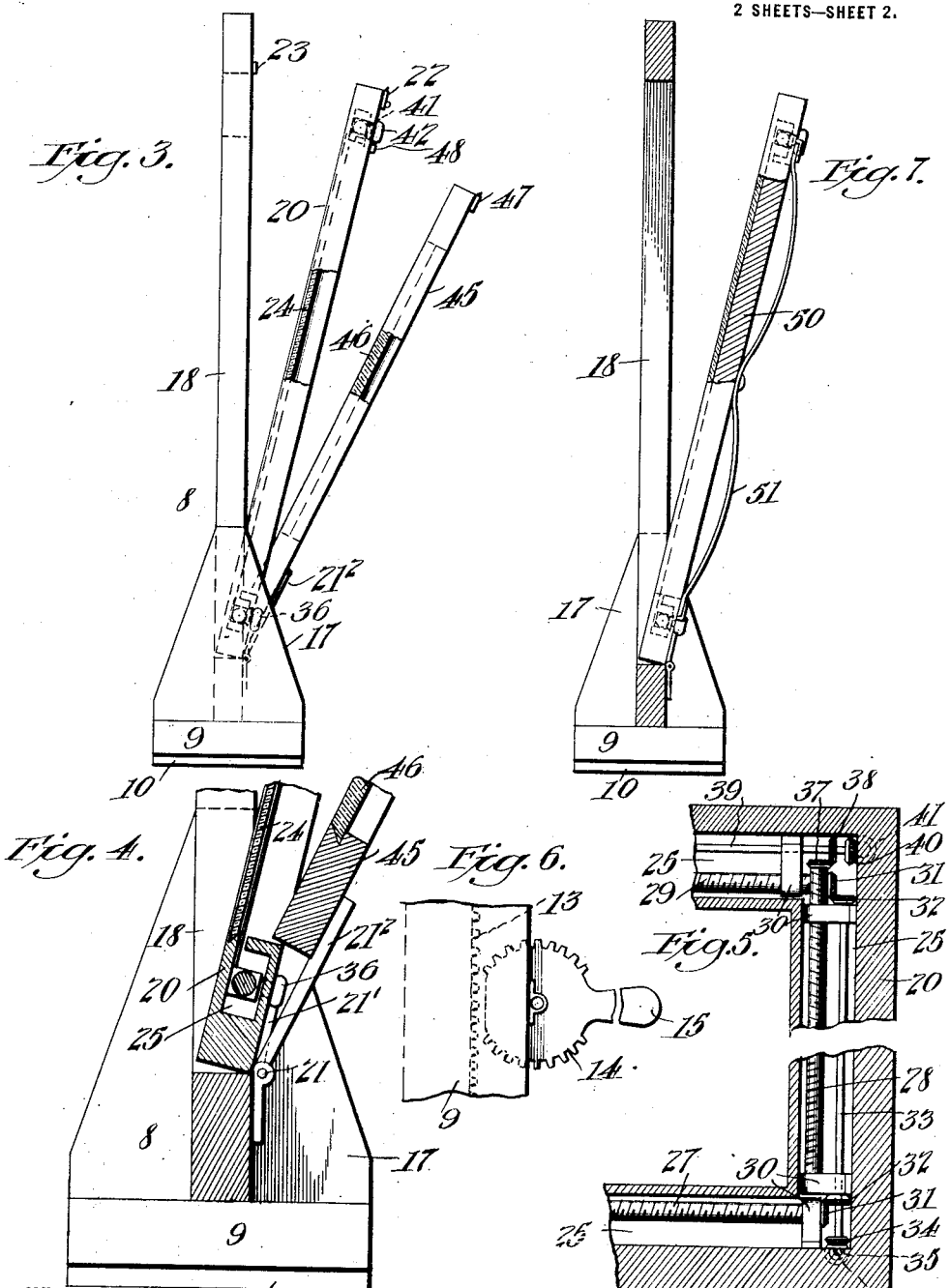

UNITED STATES PATENT OFFICE.

ELSAMUR S. FRENCH AND WALTER H. CARSON, OF DENVER, COLORADO; SAID CARSON ASSIGNOR TO SAID FRENCH.

EASEL.

1,141,704.  Specification of Letters Patent.  Patented June 1, 1915.

Application filed November 19, 1913. Serial No. 801,811.

*To all whom it may concern:*

Be it known that we, ELSAMUR S. FRENCH and WALTER H. CARSON, citizens of the United States, residing at Denver, in the county of Denver and State of Colorado, have invented certain new and useful Improvements in Easels, of which the following is a specification, reference being had therein to the accompanying drawing.

This invention relates to certain new and useful improvements in easels and more particularly to that class of easel employed in enlarging, reducing, copying or lantern-slide work, when used in connection with artificial or daylight by photographers for dark room or finishing work; the object being to provide an easel which is exceedingly simple and cheap in construction and one which is mounted upon a carriage in order to enable the same to be quickly adjusted into the desired position for the purpose of obtaining the desired sized image in enlarging or reducing a photograph or the like.

Another object of the invention is to provide an easel with an adjustable mask which can be quickly adjusted to form any sized rectangle in order to obtain any portion of a negative required, which enables the photographer to make prints with square, clear-cut white borders of any size, or fancy or shaded borders, thereby overcoming the disadvantages now existing with easels of this character now in use.

Another and further object of the invention is to provide an easel which is composed of three frames; one frame being rigidly mounted upon a movable support or carriage; the other two frames being arranged within one another and connected to the first frame by spring hinges in order to allow the frames to be swung apart to enable the sensitive paper or plate to be quickly inserted between the glass carried by the respective frames, when the frames are in lowered position.

Another object of the invention is to provide one of the frames with a ground glass in order to enable the photographer to focus the image thereon before inserting the sensitive paper or plate between the plate glass and ground glass carried by the respective frames.

Another and further object of the invention is to provide an easel which is carried by a carriage mounted upon a track in order to allow the same to be adjusted in respect to the enlarging or reducing camera; means being provided for focusing the easel in order to obtain a fine adjustment after the initial adjustment has been obtained.

Another and still further object of the invention is to provide a mask composed of marginal strips mounted upon threaded rods capable of moving in pairs toward and away from each other by the operation of thumb knobs so as to adjust the size of the rectangle within the strips in order to obtain the portion of the negative desired or to form a clear-cut white, or shaded border on the print.

Other and further objects and advantages of the invention will be hereinafter set forth and the novel features thereof defined by the appended claims.

Figure 2:
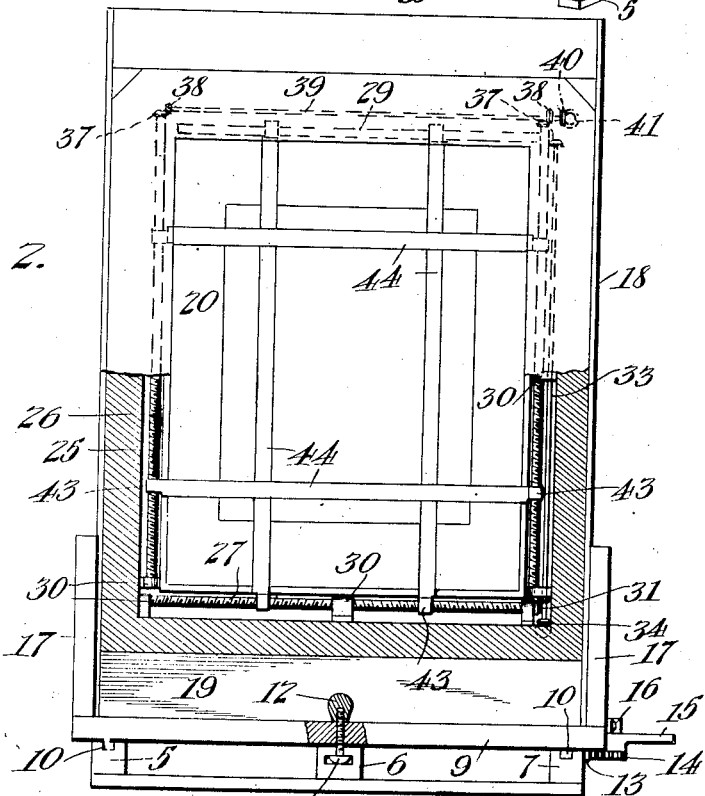

In the drawings—Figure 1, is a perspective of our improved construction of easel showing the application of the same; Fig. 2, is an elevation partly in section; Fig. 3, is a side elevation with the movable frames swung apart; Fig. 4, is a detail enlarged vertical section through the easel; Fig. 5, is a detail section showing the arrangement of the threaded rods and operating gears for adjusting the mask strips; Fig. 6, is a detail top plan of the focusing means for obtaining the fine adjustment of the movable support; and Fig. 7, is a vertical section through a slightly modified form of easel.

Like numerals of reference refer to like parts in the several figures of the drawings.

In the drawings, 1 indicates an enlarging or copying camera having the usual lens 2 and provided with a light opening at its rear end in which is adapted to be placed, a light such as a carbon arc or mercury arc for projecting the negative arranged within the camera through the lens upon the paper carried by the easel, which will be later described. The above description is given so that the operation of the easel used in connection with an enlarging camera, can be readily understood and while we have shown a camera employing artificial light, it is of course understood that daylight can be employed in order to accomplish the same result. The light-tight box of the enlarging camera, is preferably formed of sufficient size to allow the insertion of artificial lights 3 at its forward end in such a position that the rays therefrom will be projected upon the image arranged upon a suitable support within the camera, the particular form of lights employed forming no part of our invention, as a carbon arc or mercury arc or Aristo lamp may be used in connection with the camera for enlarging or copying work and in order to illustrate the application of the easel, which will be later described. We have shown a combination camera, but it is of course understood that an ordinary enlarging camera can be employed, or a camera constructed especially for copying work can be employed.

When the easel is used in connection with an enlarging camera, the negative is mounted therein in the ordinary manner and projected through the lens of the camera by a light 4, either daylight or artificial, onto the paper carried by the easel. When used in connection with copying work, an image is placed within the box of the camera, but it is of course understood that the light opening at the rear end has been closed and the lights 3 turned on and the image will be projected through the enlarging camera onto a sensitive plate or paper arranged within the easel, in order to enlarge or reduce the same as the case may be, and while we have illustrated a camera of this particular construction, we wish it to be clearly undersood that our construction of easel can be used in connection with any construction of camera and for any purpose desired, without departing from the spirit of our invention; the above descriptions being given so that the operation of our improved construction of camera, as will be hereinafter fully described, will be clearly understood when used for enlarging or copying work.

Extending forwardly from the front of the camera, are parallel rails 5, 6 and 7 mounted upon suitable ties forming a rigid track which can be moved from place to place as desired, and while we have shown the same extended from the camera, it is of course understood that a track can be moved independently of the camera in order to allow the easel, as will be later described, to be used for various purposes. The outside rails 5 and 7 are grooved longitudinally and the central rail 6 is provided with a longitudinally extending T-shaped groove in cross section, as clearly shown in Fig. 2, for the purpose hereinafter fully described.

Mounted upon the rails 5, 6 and 7, is a carriage 8 comprising a base 9 provided with depending guide members 10 fitting snugly within the grooves of the outside rails in order to hold the carriage in proper position thereon as the same is moved backward and forward upon the track or in respect to the enlarging camera, when used in connection therewith.

The base 9 of the carriage carries a headed bolt 11; the head of which is arranged within the T-shaped groove formed in the central rail 6 and the threaded portion of the bolt projects through a bore formed in the base 9 and extends upwardly therefrom and upon which is mounted, a knob nut 12 adapted to clamp the base firmly upon the rails in adjusted position in respect to the enlarging camera.

The rail 7 is preferably provided with a rack 13 along one side adapted to be engaged by a mutilated gear 14 formed on the end of a lever 15 which is pivotally mounted on a depending bracket 16 carried by the carriage 8 in order to move the carriage in either direction so as to obtain a fine adjustment in focusing the easel, and it will be seen that when the mutilated gear is in the position shown in Fig. 6, the carriage is free to move upon the track in either direction; it of course being understood that the knob nut 12 has been previously loosened and after the initial adjustment has been made, the knob nut 12 is tightened sufficiently to hold the carriage from being moved accidentally upon the track.

When it is desired to obtain a slight adjustment of the carriage in either direction in focusing the easel, by operating the lever 15, the mutilated gear will be thrown into engagement with the rack so as to move the carriage slightly upon the rails in the desired direction.

The base of the carriage 8 is provided with end supports 17 between which is mounted, a rectangular wooden frame 18 which is held firmly in a vertical position therein by any suitable means, and while we have shown and described the frame 18 as being reinforced, upon its edges by metal strips, it is of course understood that any suitable construction of frame can be employed and that the configuration can be changed, but for ordinary purposes, a rectangular frame is employed. We do not wish to limit ourselves, however, to the use of any particular material in constructing this frame, or to any configuration, as in some instances it might be found preferable to construct the same of metal and in another instance of wood or the shape of the frame might be changed.

The frame 18 is secured firmly perpendicularly between the supports 17 of the carriage in order to form a rigid support for the supplemental frames, as will be later described. Mounted within the frame 18 is a frame 20 formed of any suitable material which fits snugly therein and is supported by a pair of compound spring hinges 21 at its lower edge and is held within the frame 18 at its upper edge by a spring catch 22 which coöperates with a keeper 23 carried by the frame 18 as clearly shown in Figs. 1 and 3, whereby the frame can be swung outwardly as shown in Fig. 3, against the tension of the spring hinges or moved within the frame 18 where it will be maintained by the spring catch 22 cooperating with the keeper. This frame is also rectangular in shape and is provided with a thin plate glass 24 upon which the plate or paper is adapted to be placed, as will be hereinafter fully described.

The side and end bars constituting the frame 20 are provided with longitudinal pockets 25 having longitudinal slits in their inner faces adjacent the plate glass as clearly shown in Fig. 4. Arranged within these pockets, are threaded rods 26, 27, 28 and 29 having oppositely threaded end portions; said rods being mounted in bearings 30, one being arranged at each end and at the middle of each rod and the rods are preferably grooved to receive the bearings in order to prevent the same from moving longitudinally within the pockets 25 as they are rotated.

The two horizontally threaded rods are provided with beveled gears 31 at one end, which mesh with beveled gears 32 carried by a shaft 33 on which is fixed a beveled gear 34 meshing with a beveled gear 35 carried by a knob shaft 36 extending at right angles to the horizontal rod. The knob of this shaft 36, is arranged beyond the bar of the frame at the lower corner thereof in such a position that the same can be readily operated by the photographer in order to rotate the threaded rods in either direction.

The vertically threaded rods 26 and 28 are provided with beveled gears 37 at their upper ends which mesh with beveled gears 38 carried by an operating rod 39 arranged in the top horizontal bar of the frame; said rod carrying a beveled gear 40 meshing with a beveled gear 41 carried by a knob shaft 42 arranged at right angles the knob of which, is arranged in such a position that the same can be readily turned by the photographer, and as shown in the drawings, these knobs are preferably arranged in vertical position, one above the other upon the same side of the frame, but it is of course understood that the position of these operating knob shafts is immaterial as the main function thereof, is to provide means for facilitating the rotation of the threaded rods.

Mounted on the ends of the rods 26, 27, 28 and 29 or to each of their longitudinal middles, are nut portions 43 of mask strips 44, the horizontal mask strips overlapping the vertical mask strips in such a manner that by operating the knob shafts 36 and 42, the pair of vertical and horizontal mask strips can be moved toward and away from each other to form a rectangular opening of the desired size, so as to expose the portion of the negative desired or to form the print with the desired width margin. These strips are preferably formed of thin sheet metal so as to occupy the least possible space and when in position, fit snugly against the inner face of the plate glass of the frame 20 upon which the sensitive paper or plate is placed.

The longitudinal slits formed in the side bars of the frame communicating with the pockets, allow the strips to move freely as the threaded rods are rotated and by this construction, we are enabled to hold the strips snugly against the plate glass as they are moved back and forward within the frame.

The compound hinges 21 which are carried by the fixed frame 18 are provided with overlapping leaves 21', 21²; the leaves 21' being connected to the frame 20 at its lower edge and the leaves 21² are connected to the lower edge of a frame 45 which fits snugly within the frame 20 and this frame is provided with a plate of ground glass 46 adapted to clamp the plate or paper in position against the plate glass 24 over the mask strips 44, the springs yielding sufficiently to accommodate the difference in thickness between a plate of glass and a sheet of paper and the springs normally have the tendency to hold the frame 45 within the frame 20 and it will be seen that by releasing the spring catch 22, the frame 20 with the frame 45 can be moved in respect to the frame 18 as is clearly shown in the drawings. The frame 45 is secured in position within the frame 20 by a spring catch 47 cooperating with a keeper 48 carried by the frame 20 in order to hold the two frames in close relation with each other. By this construction the frame 20 is free to move in respect to the frame 18 and the frame 45 is free to move in respect to the frame 20 or the frame 20 with the frame 45 can be moved together.

Upon the ground glass 46, a central vertical line is marked which is intercepted by a horizontal centrally arranged line; these lines being graduated in order to form a scale and they may be formed upon the ground glass by etching or by permanently affixing thereto, a thin strip of any suitable material. This enables the correct placing of a piece of paper or a plate upon the plate glass in order to allow the mass to be adjusted in respect thereto in order to obtain the desired portion of the plate or paper.

In the form shown in Fig. 7, the main frames 18 and 20 are constructed substantially in the same manner as disclosed in the preferred form, but instead of providing a hinged frame 45, a detachable solid back 50 is employed for clamping the plate or paper against the plate glass of the frame 20 by means of the spring members 51 and while we have shown this form, it is of course understood that various other changes in construction can be made without departing from the spirit of our invention.

From the foregoing description, it will be seen that we have provided an easel which is constructed of a series of frames, one arranged within the other, one of the frames being provided with a plate glass and the other with a ground glass held in contact by spring hinges in order to hold the paper or plate between the glasses. It will also be seen that we have provided a masking device in connection with one of the frames composed of a series of right-angled arranged strips mounted upon threaded rods which are operated by knobs carried by shafts having driving connections with the threaded rods for moving the strips toward and away from each other.

We claim:

1. An easel, comprising a frame having a plate glass arranged therein, and a second frame movably mounted in respect to the first frame, having a ground glass arranged therein adapted to contact with the plate glass.

2. An easel, comprising a series of nesting frames, two of said frames being provided with contacting glass plates, and a carriage for supporting said frames, one of said plates being a focusing glass.

3. An easel, comprising a frame having pockets formed in the side bars thereof, threaded rods mounted in said pockets, mask strips connecting said rods and provided with nuts mounted upon said rods, and means for rotating said threaded rods to move said mask strips toward and away from each other.

4. An easel, comprising a frame having pockets formed in the side bars provided with longitudinal slits, rods mounted in said pockets provided with oppositely threaded ends, mask strips provided with nuts mounted upon said rods, and means for rotating said rods for adjusting said mask strips in respect to one another.

5. A photographic easel, comprising a movable carriage, a frame fixed to said carriage, a second frame nesting in the fixed frame having a plate glass secured therein, and a third frame nesting within the second frame having a ground glass arranged therein coacting with the plate glass.

6. An easel, comprising a vertically arranged fixed frame, a pair of nesting frames carried by said fixed frame and adapted to fit within the same, said nesting frames being capable of moving in respect to each other, means for locking said frames one within the other, and glass plates arranged within said nesting frames having contacting faces, one of said glass plates being a focusing plate.

7. An easel, comprising a series of nesting frames, two of said frames being movably mounted in respect to the other frame, glass plates carried by said movable frames having contacting faces, means for locking said frames within one another, one of said glass plates being a focusing glass, and mask strips carried by one of said frames having means for moving said strips in respect to each other.

8. An easel, comprising a series of vertically disposed nesting frames, one of said frames being provided with a plain glass and the other with a focusing glass, and means for holding said glass plates in contact with one another.

9. An easel, comprising a series of nesting frames, one of said frames being provided with a plate glass and the other with a focusing glass having positioning lines marked thereon, and means for holding said glass plates in contact with one another.

10. An easel, comprising a series of nesting frames, two of said frames being provided with plates of glass contacting with one another one of said glass plates being a focusing glass, one of said frames being provided with horizontally and vertically arranged mask strips, and means for operating said mask strips.

11. An easel, comprising a series of nesting frames, one of said frames being provided with a plate glass, and another of said frames being provided with a ground glass plate contacting with the plain glass plate, and mask strips carried by the frame with the plate glass and contacting with the inner face thereof, said mask strips being arranged in pairs, and means for independently moving each pair of mask strips in unison.

12. An easel, comprising a frame having a plate glass arranged therein, the side and end bars of said frame being provided with longitudinally arranged pockets having slits communicating therewith in their inner edges, rods revolubly mounted in said pockets having oppositely threaded ends, mask strips contacting with the inner face of said plate glass having nuts at their ends mounted upon said threaded rods, and means for rotating said rods for adjusting said mask strips in respect to each other.

13. In an easel, the combination with a movable carriage, of a frame mounted upon said carriage, a plate glass arranged within said frame, said frame being provided with longitudinal pockets in its side members, having longitudinal slots communicating with the inner edges thereof, oppositely threaded rods mounted to rotate in said pockets, metal strips having nuts at their ends mounted upon the respective ends of said threaded rods, and knob shafts having driving connections with said threaded rods for moving said strips in pairs toward and away from each other.

14. An easel, comprising a frame provided with a plate glass and having longitudinal pockets formed in its side and end members, said pockets communicating with longitudinal slits formed in the inner edges of said side and end members, oppositely threaded rods revolubly mounted in said pockets, mask strips provided with nuts mounted upon said rods, gears carried by said rods, driven shafts provided with meshing gears, and knob shafts having driving connections with said driven shafts for revolving said rods for moving said mask strips in pairs toward and away from each other.

In testimony whereof we affix our signatures in presence of two witnesses.

ELSAMUR S. FRENCH.
WALTER H. CARSON.

Witnesses:
W. A. HART,
L. M. PRATT.